(No Model.)
J. VICARS, T. VICARS, & J. VICARS, THE YOUNGER.
MACHINE FOR CUTTING AND PANNING BISCUITS.
No. 510,105. Patented Dec. 5, 1893.
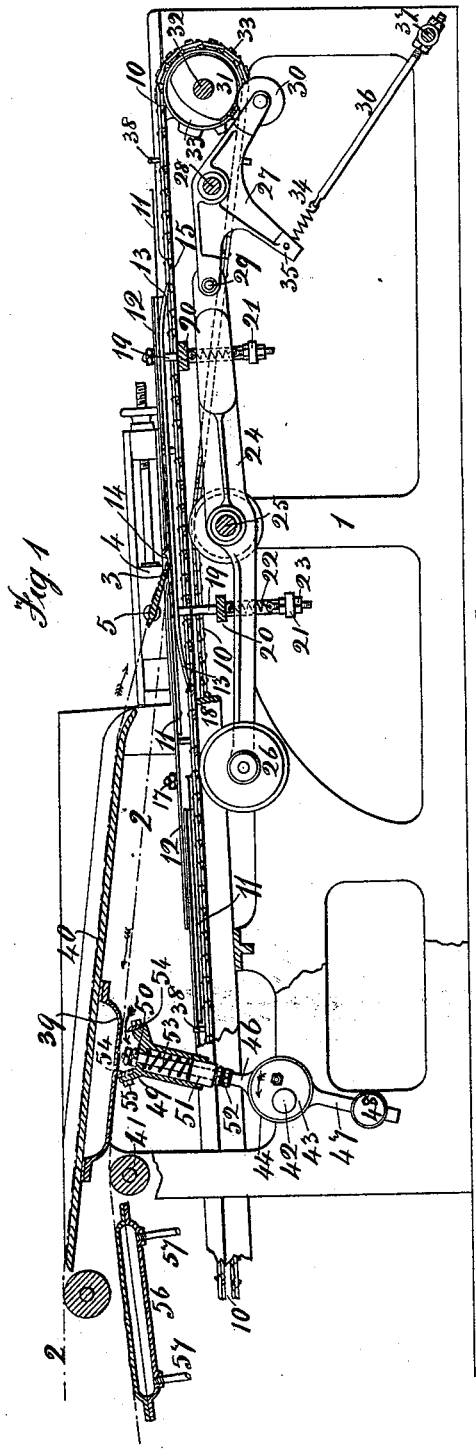
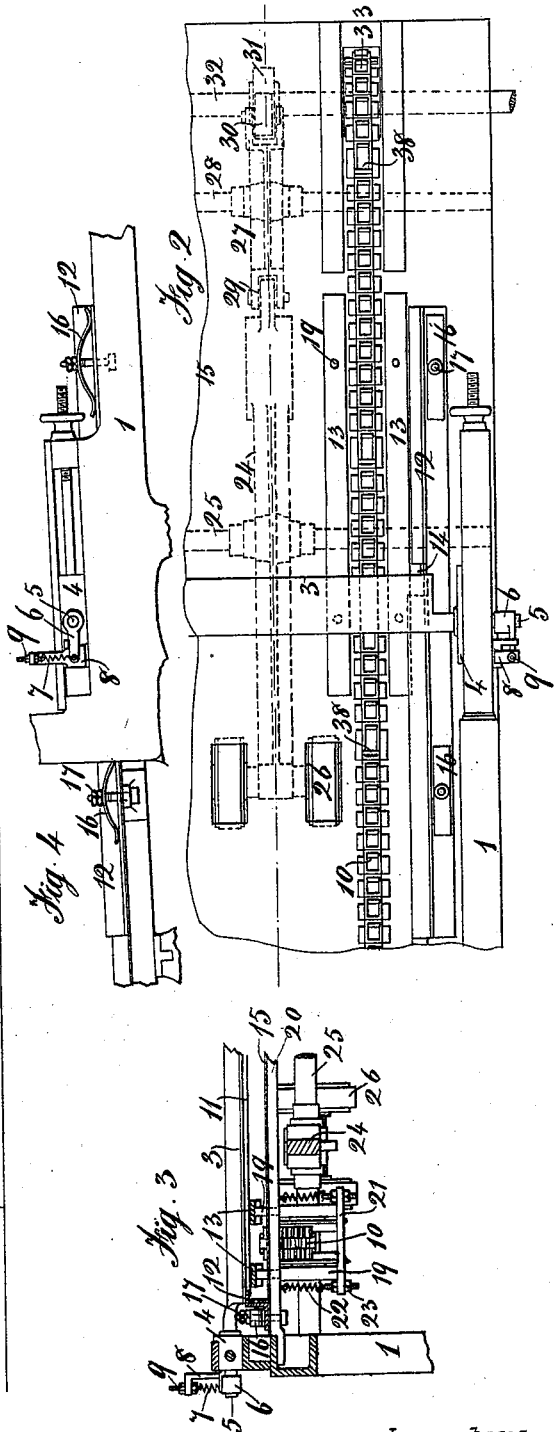
Witnesses
Inventors
John Vicars
Thomas Vicars
John Vicars the yr
by W. Bakewell & Sons
their attorneys

UNITED STATES PATENT OFFICE.

JOHN VICARS, THOMAS VICARS, AND JOHN VICARS THE YOUNGER, OF LIVERPOOL, ENGLAND.

MACHINE FOR CUTTING AND PANNING BISCUITS.

SPECIFICATION forming part of Letters Patent No. 510,105, dated December 5, 1893.

Application filed June 16, 1893. Serial No. 477,841. (No model.) Patented in England September 1, 1890, No. 13,704, and January 29, 1891, No. 1,640; in France July 9, 1891, No. 214,768; in Germany July 11, 1891, No. 65,577; in Italy September 20, 1891, No. 30,459; in Belgium September 25, 1891, No. 96,540; in Victoria September 29, 1891, No. 9,097, and in New South Wales October 2, 1891, No. 3,308.

*To all whom it may concern:*

Be it known that we, JOHN VICARS, THOMAS VICARS, and JOHN VICARS the Younger, subjects of the Queen of Great Britain, residing at Liverpool, in the county of Lancaster, England, have invented a new and useful Improvement in Machines for Cutting and Panning Biscuits, (for which we have obtained Letters Patent in Great Britain, No. 13,704, dated September 1, 1890, and No. 1,640, dated January 29, 1891; in France, No. 214,768, dated July 9, 1891; in Germany, No. 65,577, dated July 11, 1891; in Victoria, No. 9,097, dated September 29, 1891; in New South Wales, No. 3,308, dated October 2, 1891; in Belgium, No. 96,540, dated September 25, 1891, and in Italy, No. 30,459, dated September 20, 1891;) and we do hereby declare that the following is a full, clear, and exact description of the invention.

Figure 1 is a longitudinal section, and Fig. 2 is a plan of part of a machine as usually constructed for rolling dough and cutting and panning biscuits showing our improvements in position. Fig. 3 is a transverse view part in elevation and part in section of the resilient pan guides and knife edge, and Fig. 4 is a side view showing details of the guide springs and knife edge mechanism.

Machinery for treating dough in the manufacture of biscuits is now generally made so as to roll the dough to the required thickness, to cut the rolled dough into biscuit blanks, to carry away the residue of the sheet of dough not cut into blanks, to deposit the blanks over a knife edge onto pans or trays carried by endless chains moving intermittently to bring the said pans or trays close to the knife edge during delivery of the biscuit blanks to the pans or trays, to hold them firmly in place and to deliver such pans or trays near the oven. Now in the combined machinery performing the numerous operations above recited, all the various functions have to be conducted without hitch, or otherwise much loss and damage are liable to occur.

Among others there are the following derangements which are very liable to happen and which may cause loss of dough and damage to the machine besides entailing great delay and trouble in preventing continuous and steady working. (*a*) the knife edge over which the biscuits are delivered to the pans or trays may be broken or distorted by displacement of the pans or trays, or by foreign or obstructive bodies falling on such pans or trays; (*b*) pans or trays may be thrown out of position so as to disarrange the biscuits or injured, if not quite correctly placed on the traveling chains or if they meet with any obstruction; (*c*) dough and biscuit blanks may adhere to the endless web carrying them to the pans or trays and get into the way of the sheet of dough to be cut into blanks; (*d*) the said web gets damp and the dough cannot be readily removed from it.

Now the object of our invention is to so construct such machines that the above objections and difficulties are overcome.

1 represents part of the framework of a machine for rolling dough and cutting and panning biscuits.

2 represents the endless web which receives the biscuit blanks from the cutters and traveling in the direction of the arrows passes over the knife edge 3 where the biscuit blanks are delivered to the pans or trays. The knife edge is carried in the usual adjustable blocks 4, but instead of being firmly secured thereto, such knife edge is provided with journals 5 which pass freely through bearings in the said blocks 4. To one of the journals outside a block 4 is attached a crank 6. The free end of this crank is coupled by a spring 7 to a block 9 adjustably held in a bracket 8 by the usual adjusting screw and nuts. Each journal may be fitted with a crank and spring if desired. It will be seen that by the above construction, the knife edge will be free to rise and allow any misplaced pan or obstruction to pass without being injured.

10 are the chains on which the pans or trays are carried.

11 represents a pan or tray.

12, 13 are upper and lower guides between which the pans or trays pass close to the knife edge 3, while the biscuit blanks are being deposited on them. The upper guides 12 are formed of angle irons with an opening 14 for the passage of the knife edge 3 and the said guides 12 are held down against a plate 15 secured to the frame 1 by springs 16 held in position and adjusted as to tension by bolts and nuts 17 which pass through the said plates 15, cross bars and guides 12. The plate 15 also serves as a rest or carrier for that portion of the endless chains for the time being uppermost, the edges of the under portion of the chain resting on carriers 18 secured to the frame 1. The lower guides 13 are carried on spindles 19 which pass through cross bars 20 secured to the frame 1. The spindles 19 are connected at their lower ends by struts 21, and between the struts 21 and the cross bars 20 are springs 22 provided with adjusting nuts 23 for the purpose of holding up the lower guides. The height to which the lower guides rise is regulated by means of the spindles 19 being thicker beneath the cross bars 20 so as to abut against them. From the above construction it is provided that while pans 11 are passing between the guides 12 13 during delivery of the biscuit blanks to the pans or trays any obstruction or irregularity of action will cause the guides to give way owing to the resilience of the springs and damage will be avoided.

24 is a lever carried by a shaft 25 pivoted in the frame 1.

26 are pulleys free to revolve on a cross axis carried by the lever 24, and the plate 15 is made with apertures through which the peripheries of the said pulleys may pass.

27 is a lever carried by the shaft 28 pivoted to the frame 1. One end of the lever 27 is coupled to the lever 24 by a loose joint 29. The free end of the lever 27 carries an antifriction pulley 30. The antifriction pulley 30 bears against a cam 31 secured on a shaft 32 pivoted to the frame 1. The shaft 32 also carries the chain wheels 33 which are of such diameter that the chains 10 move a distance equal to that from the leading edge of one pan to the leading edge of the next pan each revolution.

34 is a spring attached at one end to an arm 35 which forms part of the lever 27 and at the other end to a rod 36 pivoted to the frame 1 at 37. During the rotation of the cam 31 the lever 27 and with it the lever 24 remains at rest while the circular portion thereof concentric with the shaft 32 is in contact with the antifriction pulley 30, but as the leading edge of a pan or tray 11 is approaching the end of the lower guide 13 the cut away portion of the cam 31 comes into contact with the anti-friction pulley 30 and the spring 34 pulling on the arm 35 keeps the said antifriction pulley in contact with the said cam, and the jointed ends of the levers 27 and 24 are depressed and the pulleys 26 raised in contact with a pan or tray 11 so as to direct its leading edge between the guides 12 and 13 and lift it up. The said pans or trays are caused to travel with the chains 10 and between the guides by means of studs 38 secured at the requisite distance apart to the links of the chains 10. Although for convenience of construction a lever 27 is interposed between the lever 24, and the actuating spring and cam, the said cam might act directly on the lever 24 so as to move it out of action while the spring acted directly thereon to move it into action. It will be obvious from the above description that the lever 24 is positively moved by the cam only to take it out of action, and that the power to cause it to raise the pulleys 26 to act on the pans or trays is obtained for the resilience of the spring 34. In this way therefore any obstruction to, or irregularity in, the motion of the pans or trays will only cause the pulleys 26 to be depressed against the resilient action of the spring 34, instead of causing damage or injury to any of the parts.

39 is a block under which the returning portion of the endless web 2 passes after delivering the biscuit blanks to the pans or trays. The block 39 is secured to the table 40 over which that part of the web 2 which is carrying the biscuit blanks to the knife edge 3 passes. The table 40 is secured to the frame 1.

41 is a guide roller for the web 2, to keep it in contact with the block 39.

42 is a shaft carried in bearings in the frame and caused to rotate by means of gearing from any suitably moving part of the apparatus.

43 is an eccentric carried by the shaft 42.

44 is an eccentric strap affixed to rods 46 47. The rod 47 passes freely through a swivel block 48 pivoted to the frame 1; the rod 46 passes freely through an armed sleeve 49.

50 are nuts for retaining the armed sleeve 49 on the rod 46.

51 is an adjustable piece on the rod 46 fitting freely within the armed sleeve 49 and adjusted as to position by the nuts 52.

53 is a spring around the rod 46 and pressing against the piece 51 and armed sleeve 49. A second eccentric, rods, and sleeve, are placed at the other side of the machine.

54 are scrapers attached to the arms of the sleeves by set screws 55. As the web 2 passes over the surface of the block 39 the scrapers 54 which move in the direction shown by the arrow when in contact with the web and extend across the said web scrape off any adhering dough or biscuit blanks, while the spring 53 insures that the said scrapers do not press against the web with sufficient force to injure it.

56 is a chamber secured to the frame 1, over which the web 2 passes after leaving the scrapers. The said chamber is provided with inlet and outlet ways 57 by which heated fluid is caused to circulate through the said chambers for the purpose of drying the web 2.

We claim—

1. The combination with an endless feeder, of a knife edge over which it passes, said knife edge being carried upon journals provided with a crank normally held in position by a spring attached thereto; substantially as described.

2. In apparatus for rolling dough and cutting and panning biscuits, the combination with an endless feeder arranged to carry trays, of upper and lower guides between which the trays pass, said guides being yieldingly held in place by springs; substantially as described.

3. In apparatus for rolling dough and cutting and panning biscuits, the combination with an endless feeder arranged to carry trays, of a lever provided with a spring arranged to press it upon the trays, and a cam arranged to act upon the lever in opposition to said spring; substantially as described.

4. In biscuit machinery, the combination with an endless carrier, of a block under which it passes, and a scraper arranged to clean the carrier while in contact with said block; substantially as described.

5. In biscuit machinery, the combination with an endless carrier, of a block under which it passes, and a spring supported scraper arranged to clean the carrier while in contact with said block; substantially as described.

In testimony whereof we have hereunto set our hands this 9th day of May, A. D. 1893.

JOHN VICARS.
THOMAS VICARS.
JOHN VICARS THE YR.

Witnesses:
 GEORGE STOCKER,
*Bookkeeper to T. & T. Vicars, 50 Seel St.*
 JAS. JOHNSON,
*Patent Agent, 6 Clayton Square, Liverpool.*